May 5, 1964 T. E. BRAY 3,132,325

ELECTRO-OPTICAL SHIFT REGISTER

Filed Sept. 24, 1959 3 Sheets-Sheet 1

INVENTOR:
THOMAS E. BRAY,
BY Richard V. Lang
HIS ATTORNEY.

ELECTRO-OPTICAL SHIFT REGISTER

Filed Sept. 24, 1959 3 Sheets-Sheet 2

INVENTOR:
THOMAS E. BRAY,
BY Richard V. Lang
HIS ATTORNEY.

May 5, 1964 T. E. BRAY 3,132,325

ELECTRO-OPTICAL SHIFT REGISTER

Filed Sept. 24, 1959 3 Sheets-Sheet 3

INVENTOR:
THOMAS E. BRAY,
BY Richard V. Lang
HIS ATTORNEY

United States Patent Office 3,132,325

Patented May 5, 1964

3,132,325
ELECTRO-OPTICAL SHIFT REGISTER

Thomas E. Bray, Clay, N.Y., assignor to General Electric Company, a corporation of New York Filed Sept. 24, 1959, Ser. No. 842,135
14 Claims. (Cl. 340—173)

The present invention relates to a logic network and has as a particular object thereof the provision of a novel logic network performing the function of a shift register and employing electro-optical units.

Shift registers are networks which provide the function of converting binary information which is supplied thereto in a time sequence on a single input line into information available simultaneously in parallel on a plurality of output lines and which are capable of shifting this information along the parallel output lines. The performance of this function is required in many types of computations, of which one example is the momentary storage and binary point shifting of the sub-products formed in multiplying two binary numbers together.

Shift registers require the use of a large number of substantially identical bistable elements whose switching rates must be synchronized to avoid error in the output, and must include means for indication of the information stored in the register. Hitherto, registers wherein large size is not a handicap have depended upon vacuum tube or transistor flip-flops while registers wherein small size is desired have usually employed magnetic core devices. Both the transistor and vacuum tube devices as well as the magnetic core devices require rather large amounts of power for operation. In the transistor and vacuum tube devices, the power is consumed continuously, largely irrespective of the rate at which the information is supplied or read out of the circuit. The core devices, on the other hand, consume no power in storing the information, but usually require a large amount of power in the process of "readout" and in shifting the information. During the "readout" of a core, it is usually necessary to determine the core condition by trying to switch it. This type of readout denominated "destructive readout" is usually resorted to although methods of high complexity are known for accomplishing a non-destructive type of readout. Thus in the usual case, relatively large amounts of power are required in a computer device employing core components, and the power dissipation therein tends to set minimum limits on the sizes of computer devices employing core elements. At the same time, even the simpler core devices give considerable difficulty of construction and assembly due to the difficulty in applying windings to the toroidal cores.

An additional practical limitation on minimum size applying to registers employing transistors, vacuum tubes or core devices is that the electrical signal must always exceed certain minimum or threshold values to permit non-ambiguous operation. It should be recognized that miniaturization is accompanied in the usual case by smaller signal magnitudes. A specific example of the consequence of these two factors is in the use of small core devices. If one reduces the core to too small a size, the core is incapable of storing the flux required to produce the minimum voltage (usually on the order of 1/10 of a volt) required to pass the signal information through the associated diode gates, as is essential to the operation of ordinary shift registers. Similar threshold limitations are found in most known shift registers.

Another limitation peculiar to shift registers employing core devices wherein destructive read out is used, is that the time of read out is limited to the moment of shifting the register.

A further limitation common to most known shift registers is the fact that the readout energy is usually quite high being comparable to the shifting energy, thus producing an undesired loading upon the storage circuit by the read out circuits.

Applicant accordingly seeks to provide a novel shift register presenting minimum constructional difficulty and having those properties of simplicity and low heat dissipation which commend it to miniaturization and additionally providing read-out at greater time freedom and without interference with the shifting and storing junctions.

It is known that one can form a shift register employing electro-optical elements. Such shift registers as are known have had several disadvantages which the present invention overcomes. One such disadvantage has been the requirement for considerable complexity in the circuitry of each of the stages to insure accurate timing of the electro-optical elements. It is an object of the present invention to provide a very simple method of achieving timing of the various stages of the register.

It is a further object of the present invention to provide a small shift register employing electro-optical elements of a high accuracy which is largely independent of variations in the time characteristics of the individual electro-optical elements themselves.

It is a further object of the present invention to provide a novel and simpler method of construction in a shift register employing electro-optical elements.

These and other objects of the present invention are achieved in a novel shift register which converts binary information supplied thereto in timed sequence upon a single input line to a simultaneous parallel output of this information. Applicant's novel shift register comprises a plurality of information storing stages connected in cascade with each stage being provided with a signal output indicative of the information stored in that stage and each stage in turn consisting of two or three cascaded electro-optical bistable elements. In accordance with the invention these bistable elements are electro-optical in nature consisting of a photoconductive element electrically connected in series with an electroluminescent element, with the electroluminescent element having a radiant feedback coupling to the photoconductive element for sustaining bistable operation. Means are additionally provided for energizing the bistable elements of each stage in succession, the energization of each of the stages being done synchronously. At the same time means are provided for synchronizing the supply of signal information to the shift register with the energization of the first bistable element of the initial stage. As a result of the foregoing measures, and by appropriate adjustment of the timing of energization, any uncertainties in operation of a shift register arising from differences in the rapidity of the operation of the individual bistable elements is eliminated. The foregoing measures thus lead to a simple and accurate shift register employing electro-optical elements.

In accordance with one aspect of the invention, each stage of the shift register is composed of three bistable elements, each successively energized in an overlapping time sequence by a separate bus providing a pulse of alternating current energy, with the duration of the pulses being selected to exceed the time of decay of the photoconductive elements employed, and the time of "overlapping" energization, during which information is transferred from one bistable element to another, being selected to insure initiation of high conductivity on the part of the photoconductive element of the succeeding bistable element. If these parameters are appropriately selected, the timing of the shift register is made independent of individual variations in the rate of operation of the electro-optical elements.

In accordance with an alternative aspect of the invention, each stage is composed of two bistable elements each successively energized by two separate buses providing alternately pulses of alternating current energy, with the duration of the time intervals of the pulses being great enough to permit decay of the photoconductive elements employed. The function of transfer of the information from one bistable element to the succeeding one is then insured by selecting photoconductors wherein the rate of decay is a finite value. In accordance with the invention, the preceding bistable element which had been previously illuminating the succeeding photoconductive element is turned off and substantially instantly thereafter the succeeding bistable element is energized. If the switching interval of energization is sufficiently small, the photoconductor will not decay but will remain in its high conductivity state, and information will then be used to energize the succeeding bistable element. This arrangement utilizing the natural property of slow decay exhibited by most photoconductors lead to additional simplicity in construction of an electro-optical shift register.

In accordance with an aspect of the invention of a constructional nature, a novel construction is disclosed employing dual-photoconductive and dual-electroluminescent elements. The foregoing duality separates the radiation path for forward signal transmission from the radiation path for feedback as between the photoconductive elements and the associated electroluminescent elements and permits a simple means of sealing out ambient light permitting one to encapsulate the optically paired dual elements.

In accordance with another structural aspect of the invention, means are disclosed for applying mass production type techniques in fabricating a shift register in accordance with the present invention in a single compact and unitary panel type structure.

The features of the invention which are believed to be novel are set forth with particularity in the appended claims. The invention itself, however, both as to its organization and method of operation, together with further objects and advantages thereof, may best be understood by reference to the following description when taken in connection with the drawings wherein:

Figure 4A:
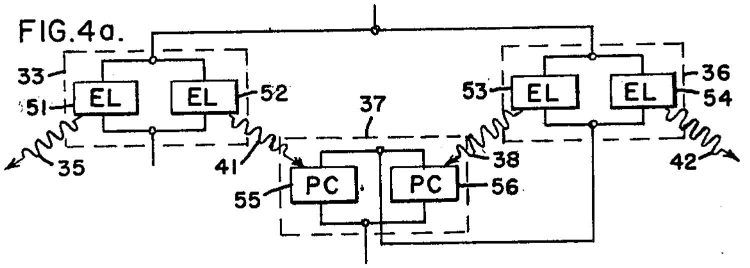
Figure 4B:
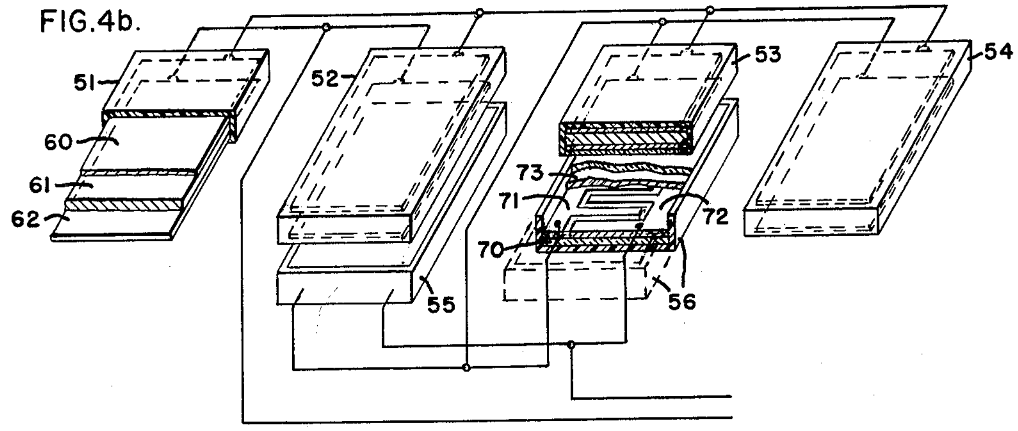
Figure 5:
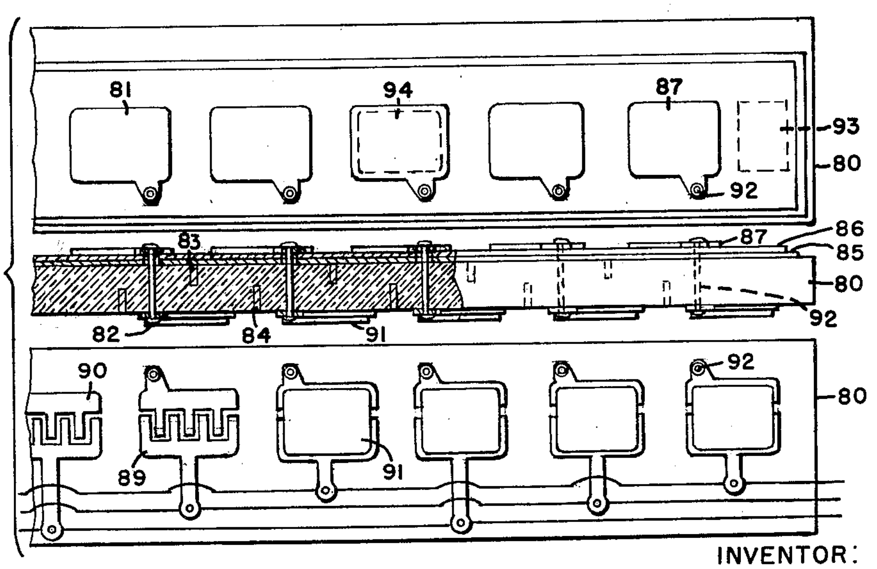
Figures 6, 7:
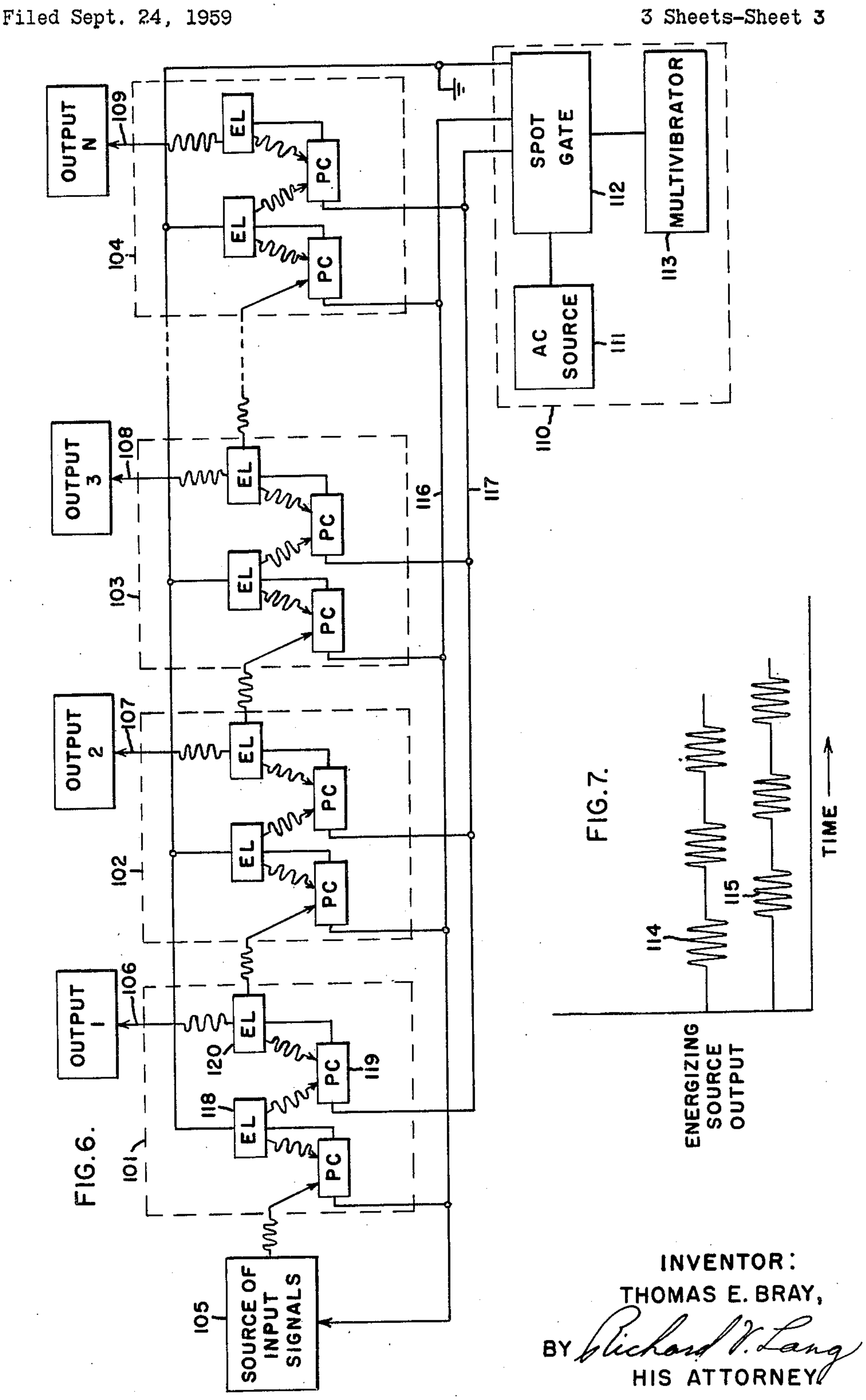

FIGURES 4*a* and 4*b* are drawings illustrating the electrical and mechanical execution of the present invention wherein applicant's novel shift register is formed of dual parts;

FIGURE 5 is a drawing illustrating the mechanical execution of the invention wherein a unitary assembly of the parts of the shift register on a single panel is employed;

FIGURE 6 is a drawing illustrating in schematic form a second embodiment of the present invention wherein each stage employs two electro-optical bistable units and;

FIGURE 7 illustrates the waveforms required for proper energization of the embodiment illustrated in FIGURE 6.

Figure 1:
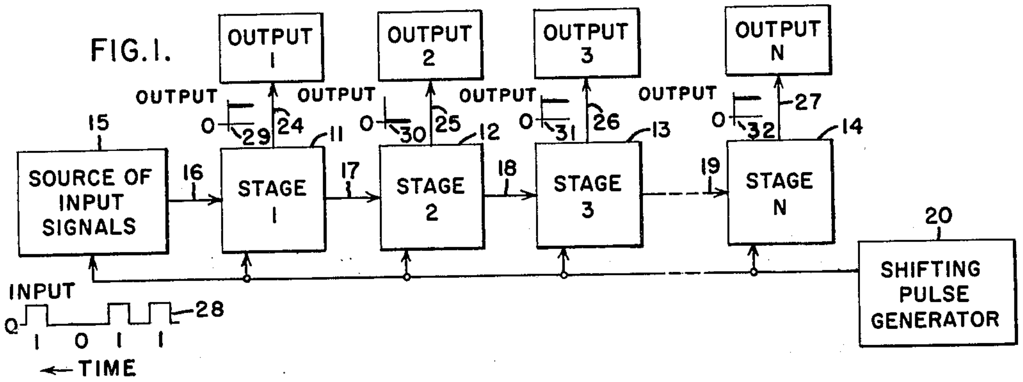
FIGURE 1 illustrates in block schematic diagram the organization of a shift register built in accordance with the present invention.

Referring now to FIGURE 1 there is shown a block diagram representing applicant's novel shift register. It may be seen to include a succession of stages 1, 2, 3, . . . N bearing the reference numerals 11, 12, 13 and 14, respectively. In a manner to be explained in greater detail with reference to FIGURES 2, 3 et seq., each stage is adapted to assume one of two alternative states of conductivity corresponding to different optical conditions and thus store one bit of information in accordance with the binary coded signals fed thereto. A source 15 of binary coded input signals is coupled by means of the signal path represented by the arrow 16 to the first stage 11. For indication of its state, and thus the information stored therein, said stage is provided with a first signal output. A second signal output of each stage is coupled to a signal input of each succeeding stage. By this second output, stages subsequent to the first each obtain their input signals from the preceding stage. The respective signal paths between stages are symbolized by the arrows 17, 18 and 19, respectively.

The exchange in formation between stages takes place in the direction indicated by the arrows (from left to right as viewed in FIGURE 1), and as is conventional with shift registers, the timing for signal exchange between stages is controlled by a timing device 20, denominated a shifting pulse generator. The shifting pulse generator in the embodiment under consideration also supplies alternating current operating energy for the stages in a manner to be described in greater detail below. The shifting pulse generator 20 is provided with an output which is coupled to each of the stages 1, 2, 3, . . . N. This output is additionally coupled to the source 15 of input signals. These connections provide for synchronism between the rate at which signal pulses are supplied to the first stage and the rate at which pulses are supplied to the subsequent stages 2, 3, . . . N. Preferably, the exchanges of signal pulses between the individual stages and the signal source occur simultaneously. The outputs 1, 2, 3, . . . N for indicating the condition of the individual stages are symbolized by the arrows 24, 25, 26 and 27.

The foregoing blocks, whose execution is as yet unspecified, together form applicant's novel shift register which provides the function of momentary "parallel" storage of a plurality of bits of information supplied in succession in time. The performance of this function is graphically illustrated in FIGURE 1. The binary coded input signal 28, appearing in the input signal path 16, contains information in the form of pulses supplied "in series" on a single path with the individual "bits" of information being supplied in timed sequence. After the information has been properly fed to the register, the bits of information are available "in parallel" at the various indicating outputs (24, 25, 26 and 27) as represented by the output waveforms 29, 30, 31 and 32 available at the respective outputs. By virtue of the connection of the individual stages to the shifting pulse generator 20, the bits of information are shifted to the succeeding stage on the occurrence of each shifting signal, irrespective of the existence of a signal at the signal input terminals.

Figures 2, 3:
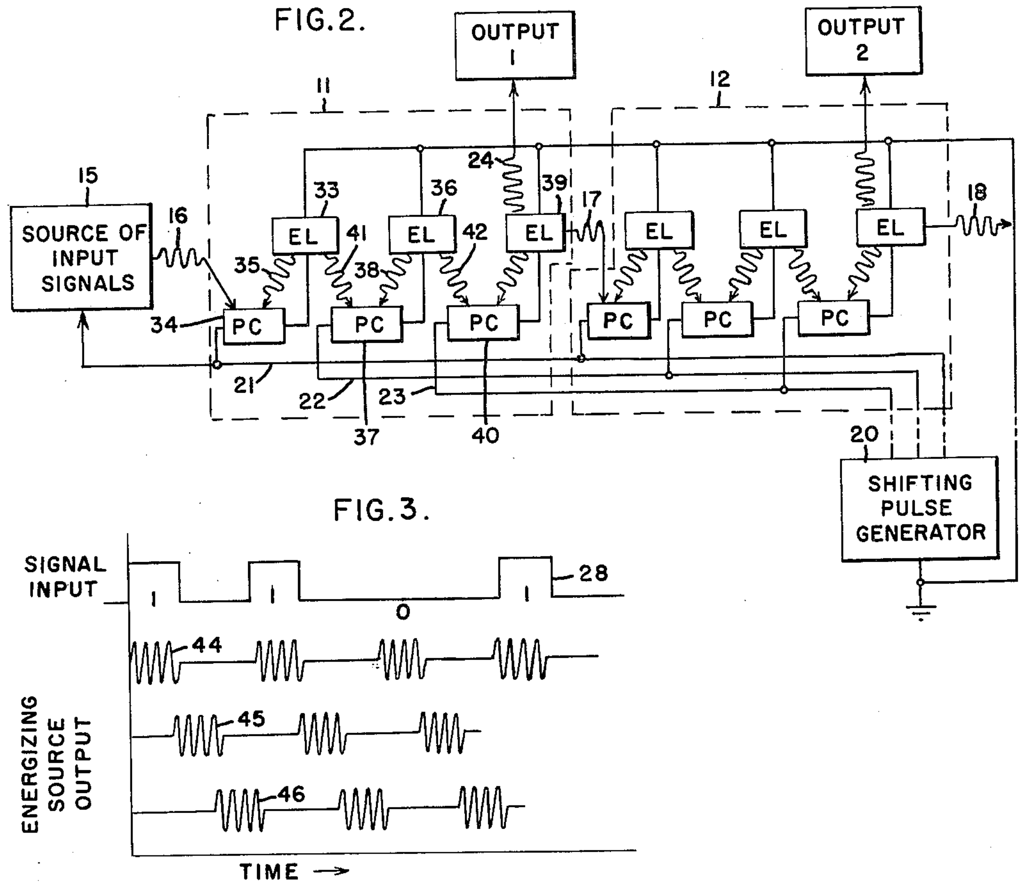
FIGURE 2 is a somewhat more detailed schematic drawing illustrating the organization of components of the blocks illustrated in FIGURE 1 in accordance with one embodiment of the invention.
FIGURE 3 is an illustration of certain waveforms explanatory of the timing relationship desired between the input signal and the waveforms developed by the shifting pulse generator 20 applicable to the embodiment of FIGURE 2.

A detailed description of one embodiment of applicant's novel shift register may now be undertaken with additional reference to FIGURE 2 showing the principal paths involving stages 1 and 2 of the shift register, FIGURE 3 containing the timing diagram explanatory of the operation, and FIGURE 4*a* showing the physical execution of components of the stages. Each of the stages 11, 12, 13 and 14 etc. are comprised of three bistable elements of the electro-optical variety connected in cascade for signal transfer. The first bistable element is formed of an electroluminescent cell 33 electrically coupled in series with a photoconductor 34. The electrical series circuit formed by the electroluminescent cell 33 and the photoconductor 34 is connected between the common or grounded bus (unnumbered) of the shifting pulse generator 20 and a first bus 21 of the shifting pulse generator. Bistable operation is facilitated by the provision of an optical feedback path from the electroluminescent cell 33 to its associated photoconductor 34, as illustrated by the arrow 35. The second bistable element of the stage 11 is formed by an electroluminescent cell 36 electrically connected in series with a photoconductor 37 between the common bus of the shifting pulse generator and a second bus 22 of the shifting pulse generator. Optical feedback for the second element is provided by means of radiation coupling as represented by the arrow 38. The third and final bistable element in the first stage is formed of an electroluminescent cell 39 electrically connected in series with a photoconductor 40 between the common bus of the shifting pulse generator and a third bus 23.

The forward signal paths interconnecting the bistable elements of the first stage 11 of the shift register are provided in the following manner. The source 15 of input signals is radiantly coupled to the photoconductor 34 of the first bistable element as indicated by the arrow 16, which source 15 produces light pulses in the form illustrated at 28. One may also use an electrical type of input applied to the electroluminescent element 33 to trigger the first bistable element. The output of the first bistable element is radiantly coupled to the second bistable element as indicated by the arrow 41 impinging on photoconductor 37. Similarly the second bistable element is radiantly coupled to the third bistable element as represented by the arrow 42 impinging on photoconductor 40. The third and final bistable element of the first stage is then coupled to the second stage as represented by the arrow 17. The radiant paths 16, 41, 42 and 17 provide respectively for signal coupling into the first stage, coupling between the three individual elements of the first stage and coupling into the succeeding stage of the shift register. The succeeding stages 12, 13 and 14 are similarly arranged.

The construction and operation of the individual bistable elements forming a portion of a stage may be more fully understood by consideration of FIGURES 4*a* and 4*b*. FIGURE 4*a* is essentially a schematic illustration and FIGURE 4*b* is a partially exploded structural view of the elements 33, 36 and 37 forming a portion of the stage 11. These figures are intended to illustrate aspects of the physical configuration and electrical interconnection of the component parts according to one practical form of the invention.

Referring now to FIGURES 4*a* and 4*b* it may be seen that each of the electroluminescent cells and photoconductive elements are formed of two substantially identical parts. The electroluminescent cell 33 is thus composed of two elements 51 and 52 electrically connected in parallel but physically separate. In a similar manner the electroluminescent element 36 is divided into separated electroluminescent cells 53 and 54 electrically connected in parallel but physically separate. The photoconductive element 37 is likewise separated into two parallel connected photoconductive elements 55 and 56.

The electroluminescent elements are then physically joined with their respective optically coupled photoconductive elements into sub-assemblies each containing only a single optical path. The elements 52 and 55 are thus assembled together in a manner providing the optical coupling path 41 for forward signal transmission. In a similar manner, the elements 53 and 56 are assembled together in a manner providing the optical coupling path 38 for feedback. Similar construction is employed throughout the register.

The parts 51–56 are illustrated in an exploded view of FIGURE 4*b*. In the completed construction, the assembled pairs of elements (52–55, 53–56) are assembled together and encased in an opaque covering. In the usual case this can be readily achieved by using opaque walls in the encapsulating members and then joining the parts by an opaque hermetic sealing compound. Since the feedback paths and forward transmission paths are separate, one may separately control the optical couplings when these units are first assembled by introducing an additional optical filter layer in the optical paths or by adjustment of the spacing between parts. The advantage of the foregoing mode of assembly is that the parts may be conveniently individually screened from incident light thus permitting convenient assembly and connection without further precautions for light screening.

The individual electroluminescent cells 51–54 are each formed as a sandwich including a first conductive layer 60, an intermediate electroluminescent layer 61 and a third conductive layer 62 which is optically transparent to permit passage of the light output of the cell. The two conductive layers 60 and 62 are provided with appropriate electrical terminals for external connection, and the assembly is suitably supported and encapsulated. Preferably the encapsulation is opaque except for a window on the undersurface to permit the light output to pass through.

In the event that one of the electroluminescent elements is used as a condition indicator of the stage, as for instance in the electroluminescent cell 39 in stage 11, then two surfaces of the encapsulated element are left transparent, and both conductive layers 60 and 62 are left transparent. This arrangement permits the optical output of the phosphor to be directly viewed, but leaves only the phosphor layer as a light barrier between ambient light and the coupled photoconductor. In order to prevent improper operation, the phosphor layer is then preferably opaque.

The photoconductive elements 55, 56 are also formed in an encapsulated sandwich. A thin conductive layer is applied upon a supporting insulating layer 70. The conductive layer is separated into two portions whose separation is by means of a narrow gap often of a serpentine configuration to increase the current carrying capacity of the unit. One portion 71 of the conductive layer is connected to a first external terminal, and the second portion 72 is connected to the second external terminal. The gap separating the conductive layers is then coated with a layer 73 of photoconductive material. The photoconductive element 55 is provided with encapsulation having a window in the upper surface for illumination of the photoconductive layer 73 while having its other walls opaque. The encapsulation also provides suitable support and protection for the photoconductive element.

We may now consider the electrical operation of the individual bistable elements and the essential electrical properties of the electroluminescent and photoconductive elements which enter into bistable operation.

Let us consider the operation of the bistable element comprising the photoconductor 34 and the electroluminescent element 33. This bistable element is now assumed to be energized by the electrical series connection of the members 33 and 34 to the shifting pulse generator 20, assumed to provide alternating energizing potentials at the moment under consideration. If the photoconductor is initially in the dark-high resistance state, the division of the applied voltage between the elements 33 and 34 is such that only a very small fraction of the total voltage available at the output of the pulse generator 20 is applied to the electroluminescent element 33 and it will not be lighted. If the photoconductor element 34 is now illuminated, it will very rapidly be converted into its low resistance condition. In the low resistance condition, the impedance of the photoconductor element is much less than the impedance of the series connected electroluminescent element and substantially all of the pulse generator output is applied across the electroluminescent cell. Under this greater applied voltage, the electroluminescent cell fires.

It may be remarked that a certain fraction of the radiation developed in the electroluminescent cell 33 is returned to illuminate the photoconductive cell 34. The tendency of this feedback of radiation is to reduce the series resistance of the photoconductive element and to retain it in its low impedance condition. The amount of light feedback is accordingly adjusted so as to insure that the photoconductive element remains in the low impedance condition. By this measure, the optical feedback causes the electroluminescent-photoconductive pairs to be capable of bistable operation, the bistable condition being indicated by the optical condition of the electroluminescent member which is either lighted or dark.

The electrical properties of the electroluminescent members and photoconductive members and mode of energization must be selected in a manner compatible with the operating requirements of each of the elements. At the present time, currently available electroluminescent cells operate with potentials usually lying in the range of from 30 volts to 200 volts. The cells of current design are operable only on alternating potentials lying generally in the frequency range of from 60 cycles to several kilocycles. The requirement for alternating current energization for the electroluminescent cell thus dictates that the pulse generator 20 provide an A.C. type of energization at a voltage meeting the firing requirements of the phosphor. The photoconductor, which may be operated either on alternating or direct current, is thus operated in these applications with the alternating current supply required by the electroluminescent element. The photoconductor is selected to have a low resistance condition selected with respect to the source voltage to fire the electroluminescent cell and to have sufficient current carrying capacity to maintain the electroluminescent cell lighted without causing overheating in the photonconductor. Although the lighted resistances of photoconductors are a very small fraction of their non-illuminated values, one must provide an applied voltage large enough to take into account the voltage losses in the photoconductors. One must also select the photoconductivity with respect to the source voltage such that the non-illuminated resistance condition will provide a low enough conductivity for maintaining the electroluminescent cell in the unlighted condition. A final factor, mentioned above, is that the two parts be in relatively good light exchanging relationship for sustaining feedback and for efficient signal transmission.

The phenomena of bistable operation in paired photoconductor electroluminescent elements is now well known, and elements which may be operated satisfactorily together are well known. Suitable electroluminescent cells may be obtained from a number of manufacturers including the General Electric Company. Suitable photoconductive cells may also be obtained from a number of manufacturers including the Hupp Company. Further details in the operation and adjustment of these elements may be had in an article entitled "An Electro-Optical Shift Register," by T. E. Bray appearing in the IRE Transactions on Electronic Computers for June 1959.

Having now described the operation of the bistable elements of applicant's novel shift register, we may now undertake an explanation of the operation of the individual stages (each including three bistable elements) and of the register as a whole. Considering now FIGURES 2 and 3 in particular, it may be observed that the shifting pulse generator is provided with three separated output lines 21, 22 and 23 and a common line. The first output line 21 is coupled to the first bistable element of each of the stages 11, 12, 13 and 14 and to the source 15 of input signals. The second output line 22 is connected to the second bistable element in each of the stages. Similarly, the third output line 23 is connected to the third bistable element in each of the stages. The graph in FIGURE 3 illustrates at 44, 45 and 46 the waves supplied respectively to the output lines 21, 22 and 23. The output waveform on each of the three output lines of the shifting pulse generator 20 is seen to consist of spaced short pulses of alternating current energy whose duty cycle is slightly in excess of one third of the time. The "carrier" waveform, it should be emphasized, is not critical so long as it is verying and may be sinusoidal, or non-sinusoidal, sawtooted, rectangular or take other forms. The individual output lines 21, 22 and 23 are energized in sequence so that slightly before the first pulse of the waveform 44 has terminated, the first pulse of the waveform 45 is initiated. Shortly before the first pulse of the waveform 45 has terminated the first pulse of the waveform 46 is initiated. Finally, shortly before the initial pulse of a waveform 46 is terminated, the second pulse of the waveform 44 is initiated. By this mode of sequential energization, it may be seen that at all times, at least one of the bistable elements of each of the stages is energized and during the moment at which one of the bistable elements is being turned off and the succeeding bistable element is being turned on, two adjoining bistable elements are energized.

The foregoing overlapping sequential energization provided by the shifting pulse generator provides for the orderly transfer of signal input information through the applicant's novel shift register in the following manner. Let us assume the generation of a pulse in the input signal source 15 in the nature of a pulse of light shown at the left in the waveform 28, and timed by means of the line 21 to coincide with the duration of the initial energizing pulse 44. This pulse of light is applied to the photoconductor and causes the photoconductor 34 to go into its low impedance condition. Since the initial bistable element is now energized by the bus 21, the first bistable element of the stage 11 is caused to fire. The initial bistable element is retained in a fired condition throughout the duration of the initial pulse 44, and its electroluminescent cell 33 projects a pulse of light upon the photoconductor 37 of the succeeding bistable element. The succeeding bistable element is not energized until the moment in time when the waveform 45 is initiated. At the moment that the bus 22 is energized, the second bistable element is permitted to assume a fired condition, and the electroluminescent cell 36 is caused to fire. Shortly after the initiation of firing of the second bistable element, the energization of the first bistable element is discontinued, and the cell reverts to its quiescent state. The light from the electroluminescent element 36 then shines upon the photoconductor 40 of the third bistable element. At the moment in time that the third bistable element is energized by the initiation of the first pulse of the waveform 46, the third bistable element is turned on, and the on condition is evidenced by a radiant output derived at the output line 24. At the same time, the lighting of the electroluminescent cell 39 provides an optical output shining on the initial photoconductor of the second stage. At the initiation of the next triad of pulses, the information in the first stage is passed on through the second stage in a similar manner.

The following explanation of the orderly transfer of the signal information through the stage 11 to the stage 12 is essentially the same whether the signal information be symbolized by the lighted condition or the unlighted condition. In the event that the signal information is zero corresponding to the unlighted condition in the cells, the darkened condition is retained as each of the bistable elements are successively energized.

The foregoing sequential energization has the advantage of minimizing the effect of inaccuracy and non-uniformity of operation of the individual electroluminescent and photoconductive elements. One need only increase the period of joint energization between succeeding bistable elements to a period sufficiently long to insure that the slowest element in the chain has time to fire. The onset of operation of the individual electroluminescent elements is quite fast, and the same is true to a lesser degree with respect to the photoconductive elements. Similarly, the period of "sole" energization (during which the adjoining elements are not energized) need only be adjusted to be long enough to insure that the slowest element in the register has time to reach its "quiescent" state. The extinction of the electroluminescent elements is quite fast, so that the principal factor entering into the extinction of the bistable element is the relatively long period for decay of the conductivity of the photoconductive element. The slow decay rate of the photoconductive elements is thus the principal limitation in the speed of operation of the register and is the consideration dictating the length of the period of switching pulses. If one wishes to increase the rapidity of operation of the register assuming a given photoconductor, one may take into account the fact that the rate of decay of conductivity of the photoconductive element is initiated at a relatively high rate while reaching its final value at a relatively slow rate. Accordingly, one may establish the general level of illumination of the photoconductor such that it is triggered to the portion of the decay curve having a maximum slope. One should also adjust the applied potentials and supply frequency such that the initial large change in conductivity reduces the applied potentials below the value required to fire the electroluminescent element. By these adjustments a rather substantial increase in operating speed may be achieved.

Applicant's novel shift register may take the form illustrated in FIGURE 4*b* or the more highly refined form illustrated in FIGURE 5 appropriate for mass production techniques. In FIGURE 5 an insulating transparent base member 80 is employed supporting upon its upper surface a succession of electroluminescent elements and upon its undersurface a succession of photoconductive elements. In order to provide for optical forward and feedback coupling between the electroluminescent elements and the photoconductive elements, the electroluminescent elements 81 are lined up in alternation with the photoconductive elements 82 on the undersurface of the glass such that each element 81 confronts portions of two elements 82. An optical barrier 83 is provided between the electroluminescent elements 81 extending downwardly from the upper surface of the support 80 to a distance approximately half way down. Similarly light barriers 84 are provided extending upwardly from the undersurface of the base member 80 and spaced midway between the photoconductive elements 82. The provision of this sequence of barriers segregates the optical feedback paths from the optical forward signal paths and also isolates the light outputs between non-adjacent bistable elements. One may also extend the barriers 83 through the support 80 and thereby eliminate the barriers 84. One may also segregate these paths by reducing the thickness of the support member 80 relative to the widths of the electroluminescent and photoconductive members, so that the desired optical paths are short and essentially in a thickness direction. By this later measure, optical barriers may be avoided in all but the most compact assemblies.

The individual electroluminescent elements are formed in the arrangement shown in FIGURE 5 by the formation of a transparent conductor 85 upon the upper surface of the base 80. A second layer of electroluminescent phosphor 86 is applied over the transparent layer 80. A succession of electrodes 87 is then applied over the phosphor layer. The electrodes 87 in the case where no external optical output is derived therefrom may be opaque. In the latter case they may be transparent.

The photoconductive elements arranged on the bottom surface of the support member 80 are formed of a pair of conductive elements 89 and 90 directly applied to the undersurface of the base supporting member 80. The conductive members 89 and 90 are arranged to have an interdigital type of boundary so as to increase the total conduction path width and thus the current carrying capacity of the photoconductive element. In smallest constructions one may prefer not to use the interdigital arrangement because of the constructional difficulty. The photoconductive material 91 is then applied over the members 89 and 90 to bridge the gap between them. The electrical serial connection between the paired electroluminescent photoconductive elements is provided by means of through connections 92 which make electrical contact with the layer 87 of the electroluminescent element and the conductive element 90 of the photoconductive elements. The other electrical connections may be taken off conventionally.

It is usually preferable to coat the entire assembly with a light opaque layer (not shown) leaving only small optical input and output areas opposite the active surfaces. In the example under consideration, an input window is provided at 93, and an optical output area for the initial stage of the register is provided by providing a transparent window 94 over the third electroluminescent element (from the left as viewed in FIGURE 5).

FIGURE 6 illustrates another embodiment of the present invention wherein a shift register employing electro-optical units is disclosed driven by a simplified two output shifting pulse register.

The shifting pulse generator illustrated in FIGURE 6 includes a plurality of stages numbered respectively 101, 102, 103 and 104 coupled to a source 105 of input signals and having outputs for each of the stages at 106, 107, 108 and 109, respectively. The register is operated by means of a shifting pulse generator 110 comprising a source of alternating current 111 supplying alternating current energy to a single pole double throw gate 112 which gate is operable to transfer the output of source 111 to one or the other of the output lines. The timing of the gate is controlled by a multivibrator 113. The shifting pulse generator is thus designed to provide an output waveform as generally indicated at 114 and 115 wherein the output waveform 114 appears on the bus 116 and the output waveform 115 appears on the bus 117. It may be observed that both waveforms consist of short pulses of alternating current energy and that the two waveforms 114 and 115 are in timed alternation.

Each of the stages of the above shift register are seen to be composed of two bistable elements, each bistable element including a photoconductor and an electroluminescent cell. In accordance with the present invention, the arrangement works in a manner similar to that explained with respect to FIGURE 3. The system has however a slightly different time relationship in the transfer of energy through the register than that explained with respect to the embodiment of FIGURE 2. In particular, upon the firing of the first bistable element of 101 and its energization by means of the waveform 114 supplied on the bus 116, the electroluminescent cell 118 is lighted and illuminates the photoconductive element 119 of the second bistable element in stage 101. The next bistable element is thereupon energized and the preceding bistable element de-energized. Because of the previous illumination of the photoconductive cell 119, and its relatively slow decay time when the second bistable element is energized by the waveform 115 on bus 117, sufficient voltage is applied to the electroluminescent cell 120 to cause it to fire. In a similar manner, the information is shifted along the various stages of the register under the control of the shifting pulse generator. This mode of operation thus uses the usual slow decay property of the photoconductor to advantage and simplifies the complexity of the supply source 110.

The methods of construction illustrated in FIGURES 4*a*, 4*b* and 5 are equally applicable to the arrangement of FIGURE 6.

While in each of the embodiments so far described, outputs have been taken from the last electroluminescent cell of each stage, one may also use the initial or intermediate electroluminescent elements.

The foregoing shift registers employing electro-optical computers are capable of very compact constructions, and the power requirements of the individual bistable elements can be reduced to the order of 10 microwatts. The rapidity operation of the shift register is ultimately limited by the time constants of the electro-optical elements employed. As hinted earlier, the electroluminescent elements may be turned on and off with considerable rapidity whereas the photoconductive elements are somewhat slower upon the turn on portion of the cycle and considerably slower with respect to the turn off condition. Accordingly, the present limitation is primarily the decay rate in the photoconductor during which the photoconductor goes from a condition of maximum conductivity to one of reduced conductivity. It is apparent that considerable strides have been made and are likely to be made in improving the operating characteristics of the electro-optical components so that greater rapidity of operation is probable in the future. At the present time, with currently available devices and employing conservation engineering design, 30 counts per second may be readily achieved with an arrangement of the nature of the embodiment of FIGURE 2. Practical constructions of the embodiment of FIGURE 6 are somewhat slower.

The use of electro-optical elements of the nature described in a shift register has the additional advantage of having the condition of the register immediately and optically apparent without resort to additional equipment or energy expenditure. One may read out the condition and use it for simultaneous read-out in a large number of paralleled output connections, also without additional energy expenditure. A further advantage is that the read out may be taken at any time (except during the instant of shifting) and this read out is independent of and produces no interference with the shifting operation of the register. Read out has no loading effect upon the shift register.

In the embodiments of the invention so far described, information has been applied solely to the input signal line and derived simultaneously from each of the output lines. One may perform the inverse operation by providing a plurality of optical inputs to the same photoconductive member (as for instance the first photoconductive member) of each of a plurality of stages and employing a subsequent electroluminescent member as the optical output member. As in the other arrangements the input information must be timed to be available during the energization of the selected input photoconductive members. This flexibility of application is a property which is not so readily obtained in other types of shift registers. In this application of applicant's shift register, the conversion requires only that one provide additional optical imputs to the photoconductive member, a matter which creates no special structural or loading problems and may be simply achieved by providing an optical path to the selected photoconductive member.

While particular embodiments of the invention have been shown and described, it should be recongized that the invention may taken other forms than those described. It is accordingly intended in the appended claims to claim all those forms of the invention which fall within the true spirit thereof.

What I claim as new and desire to secure by Letters Patent of the United States is:

1. In a shift register for converting binary information supplied thereto in timed sequence into information simultaneously available in parallel on a plurality of output lines, said outputs being shiftable at will to the next succeeding output lines, the combination comprising a plurality of information storing stages connected in cascade, each stage consisting in turn of three cascaded electro-optical bistable elements, said bistable elements including an electroluminescent member and a photoconductive member, at least one of said electroluminescent members being arranged to provide a signal output indicative of the information stored in each stage, means for energizing said three bistable elements in one stage in succession in partially overlapping time intervals, the respective elements of each of said stages being energized synchronously, and means for supplying input signals to said register in synchronism with the energization of the first bistable element of each stage.

2. The combination set forth in claim 1 wherein the duration of the period of overlapping energization is in excess of the period required to initiate high conductivity on the part of the photoconductive members.

3. The combination set forth in claim 1 wherein the time interval of energization is in excess of the time required for the photoconductive member to decay from a state of high conductivity to a state of lower conductivity insufficient to turn on an electroluminescent member coupled in series therewith to said source.

4. The combination set forth in claim 1 wherein the time interval of energization is in excess of the time required for the photoconductive member to decay from a state of high conductivity to a state of lower conductivity in sufficient to turn on an electroluminescent member coupled in series therewith to said source and wherein the duration of the period of overlapping energization is in excess of the period required to initiate high conductivity on the part of the photoconductive members.

5. In combination, a $3n$ plurality of bistable electro-optical elements, where "$n$" is any integer, each element comprising an electroluminescent member electrically connected in series with a photoconductive member with optical feedback for establishing a bistable condition in each of said elements, means for radiantly coupling the electroluminescent member of each element with the photoconductive member of each succeeding element, means for supplying shifting pulses to successive groups comprising every fourth bistable element each said group being supplied with said shifting pulses in an over-lapping consecutive sequence, means for applying an input signal to the first of said elements to convert it to a desired state, and output means optically coupled to an element in selected ones of said groups.

6. A shift register comprising a plurality of bistable electro-optical stages coupled in cascade, each of said stages comprising at least three bistable elements coupled in cascade, said bistable elements each comprising an electroluminescent member electrically coupled in series with a photoconductive member with said electroluminescent member being radiantly coupled to said photoconductive member for establishing a bistable condition in said element, means for supplying shifting pulse energy simultaneously to each like numbered element of each stage in the order of said element numbering, said shifting pulse energy being supplied in sequence to each succeeding element so as to permit signal transfer between consecutive elements while forbidding signal transfer between non-consecutive elements, means for supplying an input signal to the first elements of said first stages during the period that said first element is energized, and means for deriving an output signal from a like numbered element in selected stages.

7. A shift register comprising a plurality of bistable electro-optical stages coupled in cascade, each of said stages comprising a first, second and third bistable element coupled in cascade, said bistable elements each coman electroluminescent member electrically coupled in series with a photoconductive member with said electroluminescent member being radiantly coupled to said photoconductive member for establishing a bistable condition in said element, means for supplying shifting pulse energy to each like numbered element of each stage in the order of said element numbering, the shifting pulses supplied to each succeeding element being initiated just prior to the termination of the shifting pulses supplied to the respective preceding elements so as to permit signal transfer between consecutive elements, while forbidding signal transfer between non-consecutive elements, means for supplying an input signal to the first elements of said stages, and means for deriving an output signal from a like numbered element in selected stages.

8. A shift register comprising a plurality of bistable electro-optical stages optically coupled in cascade, each of said stages comprising a first, second and third bistable element coupled in cascade, said bistable elements each comprising an electroluminescent member electrically coupled in series with a photoconductive member with the electroluminescent member being radiantly coupled to said photoconductive member for establishing a bistable condition in each said element, and the electroluminescent member in a preceding element being radiantly coupled to the photoconductive member in the succeeding element for effecting optical signal transfer between consecutive elements and between consecutive stages, means for supplying shifting pulse energy in numerical sequence to each like numbered element of each stage, the shifting pulses supplied to each succeeding element being initiated just prior to the termination of the shifting pulses supplied to the respective preceding elements so as to permit signal transfer between consecutive elements and between consecutive stages, means for supplying an input signal to the first element of the first of said stages, and means for deriving an output signal from a like numbered element in each of said stages.

9. The combination set forth in claim 8 wherein said means for deriving an output signal is optically coupled to the third element in each of said stages.

10. The combination set forth in claim 8 wherein said means for supplying an input signal is optically coupled to the first element of the first of said stages and said means for deriving an output signal is optically coupled to the third element in each of said stages.

11. A shift register comprising a plurality of bistable electro-optical stages connected in cascade, each of said stages comprising a first, second and third bistable element coupled in cascade, said bistable elements each comprising an electroluminescent member electrically coupled in series with a photoconductive member with said electroluminescent member being radiantly coupled to said photoconductive member for establishing a bistable condition in said element, said register being formed upon a thin optically transparent electrically insulating support member having disposed in succession on one surface thereof said electroluminescent members and having disposed in succession on the other surface thereof but in alternation with the placement of said electroluminescent members said photoconductive members, each of said photoconductive members being arranged to overlap two adjacent electroluminescent members for optical coupling therewith.

12. The combinatin set forth in claim 11 wherein the width of said electroluminescent and photoconductive members, measured in the direction of succession is several times greater than the distance separating said electroluminescent members from said photoconductive members whereby the optical paths providing the desired optical couplings are short and substantially perpendicular to the surface of said support members and the coupling between non-opposing members is substantially reduced.

13. The combination set forth in claim 11 wherein optical barriers are introduced extending inwardly on at least one surface of said support member and placed intermediately between said members whereby the desired optical coupling in the thickness direction is permitted while being prohibited in the direction of member succession.

14. The combination set forth in claim 11 wherein optical barriers are introduced extending inwardly on one surface of said support member and placed intermediately between said electroluminescent members and on the other surface of said support member and spaced intermediately between said photoconductive members whereby the desired optical coupling in the thickness direction is permitted while being prohibited in the direction of member succession.

References Cited in the file of this patent

UNITED STATES PATENTS

| | | |
|---|---|---|
| 2,833,936 | Ress | May 6, 1958 |
| 2,895,054 | Loebner | July 14, 1959 |
| 2,900,522 | Reis | Aug. 18, 1959 |
| 2,907,001 | Loebner | Sept. 29, 1959 |
| 2,949,538 | Tomlinson | Aug. 16, 1960 |